(12) United States Patent
Clark et al.

(10) Patent No.: US 7,949,656 B2
(45) Date of Patent: May 24, 2011

(54) INFORMATION AUGMENTATION METHOD

(75) Inventors: Duncan G Clark, Yateley (GB); Brian C Cope, Newbury (GB); James S Luk, Cowes (GB)

(73) Assignee: International Business Machines Corporation, Armonk, NY (US)

(*) Notice: Subject to any disclaimer, the term of this patent is extended or adjusted under 35 U.S.C. 154(b) by 1920 days.

(21) Appl. No.: 10/607,462

(22) Filed: Jun. 26, 2003

(65) Prior Publication Data

US 2004/0122809 A1 Jun. 24, 2004

(30) Foreign Application Priority Data

Dec. 21, 2002 (GB) .................................. 0229898.2

(51) Int. Cl.
*G06F 7/00* (2006.01)
*G06F 17/30* (2006.01)

(52) U.S. Cl. ........................ 707/722; 345/748
(58) Field of Classification Search ............... 707/3.104, 707/101, 3, 104.1, 691, 722; 709/217; 345/748
See application file for complete search history.

(56) References Cited

U.S. PATENT DOCUMENTS

| | | | | |
|---|---|---|---|---|
| 6,078,924 A * | 6/2000 | Ainsbury et al. | ............. | 707/101 |
| 6,161,107 A * | 12/2000 | Stern | .......................... | 707/104.1 |
| 6,591,295 B1 * | 7/2003 | Diamond et al. | ............. | 709/217 |
| 6,795,819 B2 * | 9/2004 | Wheeler et al. | ................... | 707/3 |
| 2004/0100496 A1 * | 5/2004 | Creasor et al. | ................ | 345/748 |

* cited by examiner

*Primary Examiner* — Apu M Mofiz
*Assistant Examiner* — Chelcie Daye
(74) *Attorney, Agent, or Firm* — Yee & Associates, P.C.; David A. Mims, Jr.

(57) ABSTRACT

A method of augmentation in a data processing apparatus is provided. The data processing apparatus has access to an information repository (either local or remote, or both), has an operating system for executing an application (e.g. a word processing application) and a temporary data storage area (e.g. a clipboard). A specification (e.g. key word or phrase) is entered into the application and is copied from the application into the temporary data storage area. An information augmentation means polls the area in order to detect change (e.g. addition of a specification) and on doing so, retrieves the specification. The specification is used to search the repository for relating information and the search results are passed back to the area. The results are now pasted from the area to the application.

15 Claims, 16 Drawing Sheets

800 — Information Warfare can be summarised as the use of advanced technology to attack, penetrate and inhibit an organisation's use of computer systems. Clearly such an attack poses a major threat to the operational effectiveness of any modern organisation. At a commercial level such attacks may deprive a City Trading House of all trading systems, resulting in massive financial loss.
At a Government level an attack on defence and medical systems may have far more tragic consequences. The technology required to undertake such an attack is readily available, to the extent that an individual with very limited resources is still able to utilise advanced software technology in a highly damaging manner. Two of the most common methods of attacks are the release of computer viruses and the unauthorised entry into a computer system.

| IW Summary.doc --> <1> | <1><1.1><1.1.1>Information Warfare can be summarised as the use of advanced technology to attack, penetrate and inhibit an organisation's use of computer systems.</1.1.1><1.1.2> Clearly such an attack poses a major threat to the operational effectiveness of any modern organisation.</1.1.2><1.1.3> At a commercial level such attacks may deprive a City Trading House of all trading systems, resulting in massive financial loss.<1.1.3></1.1><br><1.2><1.2.1>At a Government level an attack on defence and medical systems may have far more tragic consequences. The technology required to undertake such an attack is readily available, to the extent that an individual with very limited resources is still able to utilise advanced software technology in a highly damaging manner.</1.2.1><1.2.2> Two of the most common methods of attacks are the release of computer viruses and the unauthorised entry into a computer system.</1.2.2></1.2></1> |
|---|---|

FIG. 9

INFORMATION AUGMENTATION METHOD

FIELD OF INVENTION

The present invention relates to information augmentation using a temporary data storage area.

BACKGROUND OF INVENTION

Research into information-seeking behaviour in a variety of contexts has shown that users typically formulate queries in an unstructured way, relying on "knowing what I want when I see it". Although not the full explanation, much of this behaviour derives from simply not knowing what there is available to be discovered.

It is often the case that a user has a piece of information and would like to find out more about it. The user does not know what he wants to know, or the scope of the information that might be available. He wants to know what facts are available and to have the results of his inquiry arranged in a way that enhances his understanding of the subject.

Information retrieval is one method of allowing users to gain access to information. However, for a user, the task of traversing information (e.g. on the Internet, on relational databases etc.) and finding relevant information amongst the vast amount that exists can be very difficult and time-consuming. There are numerous information retrieval techniques and tools available currently. One example is a "robot", which is a type of "agent". An agent is a computer program that is goal-oriented, that is, an agent tries to achieve some end result. Another example is a "search engine", which searches through an index of information in order to locate a particular piece of that information by keyword for example. There are two main categories of searching, namely, unfocussed and focussed. Unfocussed searching occurs when a robot or a search engine is not looking for anything in particular and its main aim is to gather as much information as possible. Focussed searching occurs when the robot or search engine is looking for a particular piece of information. This technique is used by a specialised robot, such as, a shopping robot.

Current search technology has several disadvantages. For example, when using an unfocussed searching technique in response to a query, it is more than likely that several unrelated topics of information will be found (as well as related topics). Once the results from the search are returned, the user then has to spend time trawling through the results in order to find the "hits" that are relevant to the query. Additionally, in order to filter the results, a user needs specialized knowledge of the search tool in question. Furthermore, when focussed searching is used a user does need to know what they want before they see it. Yet another disadvantage is that search technology is not integrated well with standard applications.

SUMMARY OF THE INVENTION

According to a first aspect the present invention provides a method of augmentation in a data processing apparatus, the data processing apparatus having access to an information repository, means for executing an application and a temporary data storage area, wherein a specification is entered into said application and copied from said application into said area, the method comprising the steps of: polling said area in order to detect said specification, retrieving said specification from said area, searching said information repository for information relating to said specification, passing said information to said area, and pasting said information from said area to augment said application with said information.

Preferably, the user sets the polling frequency. Preferably, the search results are automatically passed to the area. Alternatively, the search results are not automatically passed to the area. In a preferred implementation, a software agent executes the searching step. Although a string matching agent has been described, any other agents can be used e.g. a translating agent for languages, a web agent.

In a preferred embodiment, the information comprises at least one information component. The at least one information component (i.e. the search results) are preferably displayed to the user. Aptly, the information repository is stored either on a remote data processing apparatus, the local data processing apparatus, or both.

According to a second aspect the present invention provides a data processing apparatus for augmentation, the apparatus having access to an information repository, means for executing an application and a temporary data storage area, wherein a specification is entered into said application and copied from said application into said area, the apparatus further comprising: means for polling said area in order to detect said specification, means for retrieving said specification from said area, means for searching said information repository for information relating to said specification, means for passing said information to said area, and means for pasting said information from said area to augment said application with said information.

According to a third aspect the present invention provides a computer program comprising program code means adapted to perform all the steps of the above method when said program is run on a computer.

BRIEF DESCRIPTION OF THE DRAWINGS

The present invention will now be described, by way of example only, with reference to preferred embodiments thereof, as illustrated in the following drawings:

FIG. 8 represents an example text file;

FIG. 9 represents the addition of markup indexes to the text file of FIG. 8 and indexing of the document;

DETAILED DESCRIPTION OF THE INVENTION

Figure 1:
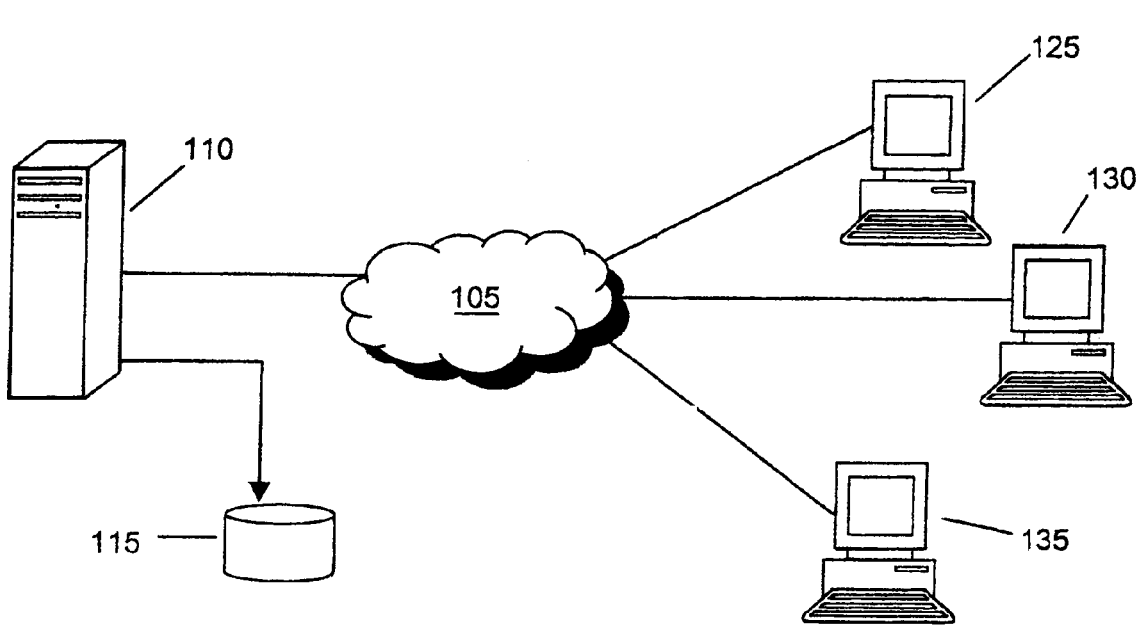
FIG. 1 shows a prior art distributed data processing system in which the present invention may be implemented.

FIG. 1 shows a pictorial representation of a distributed data processing system (100) in which the present invention may be implemented. The distributed data processing system (100) comprises a number of computers, connected by a network (105). The server computer (110) has an associated storage unit (115) and is connected to the network (105) along with other server or client computers (125, 130 and 135). In the depicted example, the distributed data processing system (100) is the Internet, with the network (105) representing a world-wide collection of networks and gateways that use the transmission control protocol over internet protocol (TCP/IP) suite of protocols to communicate with one another. Alternatively, the present invention may be implemented in a localised data processing system e.g. computer 125.

Figure 2:
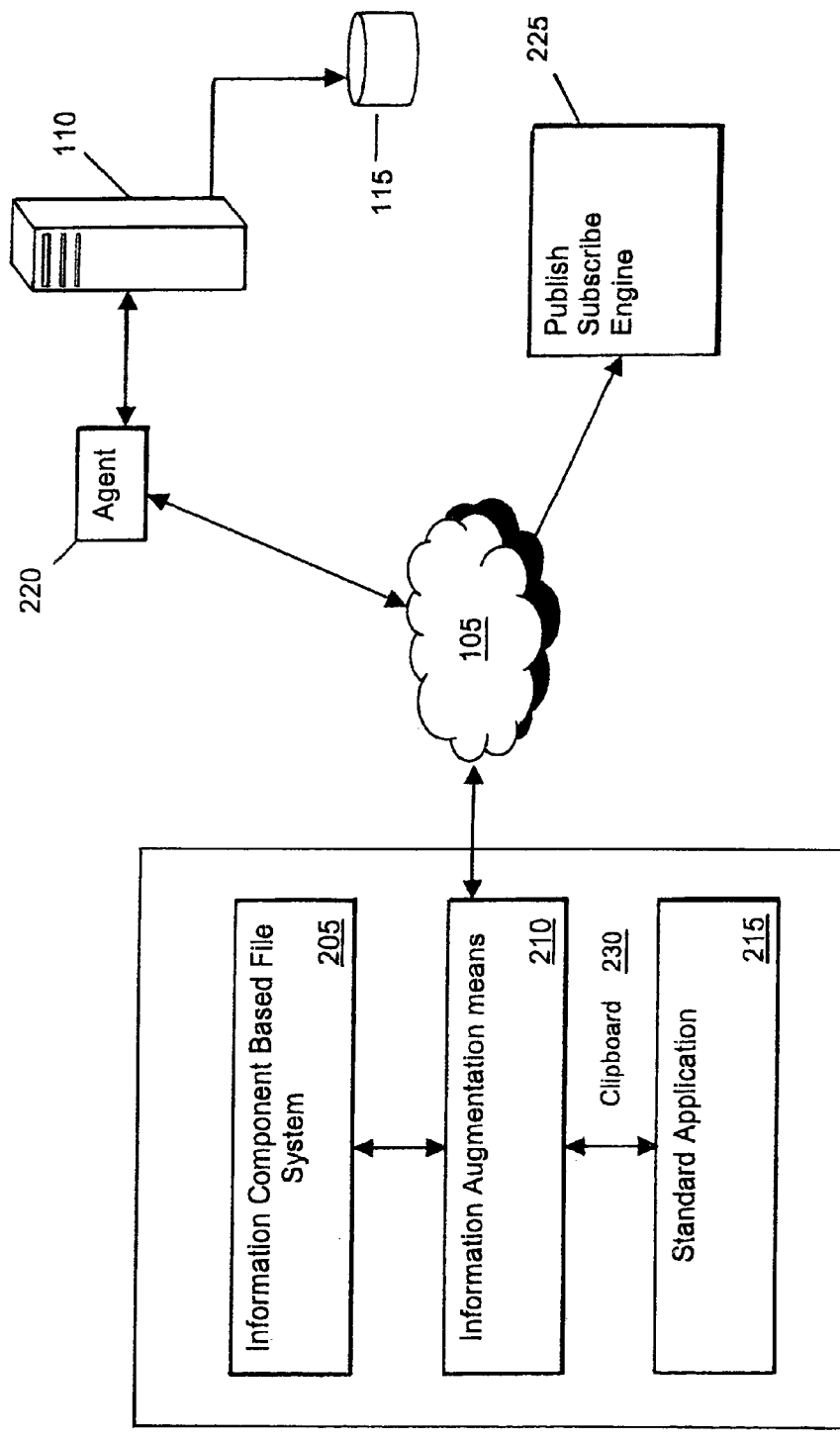
FIG. 2 shows an overview of the information augmentation means of the present invention and a distributed data processing system in which the present invention may be implemented.

A more detailed representation of a system in which the present invention may be implemented is shown in FIG. 2. A client computer (125) preferably executes an Information Component based file system (205) implemented as an application program, as described in GB patent application no. 0104227.4. In alternative embodiments, the file system (205) could be implemented as an integral component of an operating system, potentially replacing conventional operating system file systems. The main concepts associated with the system (205) will now be described.

The Information Component based file system (205) manages a set of data files and executable programs as a set of separately identifiable "Information Components" in which each Information Component corresponds to either a data file, an executable file, a portion of such a file, or a collection of file portions. An Information Component may be any block of data or a set of executable instructions comprising an identifiable, storable entity, but is typically a sub-section of a file.

The management of Information Components within the system (205) involves analyzing the contents of a plurality of files (or equivalent units of storage) to identify data components and/or executable components within different files of the data storage system which have identical content, and to identify the components which are unique. The unique and duplicated components are then each indexed as separate entities, and duplicate components are deleted to reduce redundancy—without losing any of the total data contents from the system.

The deletion can greatly reduce the physical storage space required for a typical data storage repository. Furthermore, when search operations are performed, the Information Components corresponding to the most relevant components of data files and executables can be identified without having to retrieve an entire file and without the search results including a confusing collection of duplicates, such as many different versions of a file. Where duplicates are deleted to leave a single copy of a component, the component index information is updated to reflect which components are included within which of the plurality of files.

The Information Components' index data preferably comprises markup tags which are stored together with the respective Information Components, with a unique tag pair identifying and delimiting each Information Component, and a markup tag index which associates each tagged Information Component with one or more logical positions within files of the data storage system. The index data preferably defines an information directory structure for the Information Components such that the directory structure can be extracted from stored data and displayed to a user when the data store of Information Components is loaded into memory (e.g. on system startup or when initiated by a user action). The index data may also include an identification of which series of tagged components will be found in particular portions of the data storage system, to speed up the locating of components. This is achieved by using an ordered sequence of markup tags so that it is possible, for example, to associate markup tags which begin with a particular character of the sequence with a particular range of locations within the system.

The analysis of the contents of information items preferably comprises applying a set of rules for Information Component identification and separation. In a first example, files (e.g. text files) which are stored within a data processing apparatus are each initially separated into a set of one or more Information Components. This preferably involves analyzing the contents of each stored file to identify components which correspond to a set of predefined sub-sections or data categories (e.g. text paragraphs or text sentences, figures, tables or rows/columns, presentation slides or text blocks within presentations), and then generating separate index data for each of these components. Note that the Component separation rules may differ for different file types, and an up-front identification of file suffixes can be used to determine which separation rules to apply to each file. The index data for each separate Information Component retains an association with the original file name or index entry. Now every file which is represented in the user's view of a file system is mapped to a set of indexed Information Components.

Subsequently, either in response to this separation of components or as an independent background process, the Information Components are rationalised to reduce unnecessary redundancy. This preferably involves comparing the contents of the Information Components across the set of files using a string match algorithm, running as a background process using spare processor capacity, to discover duplicate copies of data content. For each identified set of identical Information Components (duplicates), all except one are deleted from physical storage and the index information is updated so that the undeleted copy is associated with the plurality of different logical locations within the data repository in which that Information Component's content is required.

Information Components' contents can also be compared to identify Information Components which constitute part of a larger Information Component (again using string matching techniques). The data storage system is then revised to index the duplicated portion of the larger Information Component separately from the unduplicated remainder portion, and the index information for the duplicate copies is updated to reflect a merging of the duplicates—i.e. duplicate copies are deleted, to be replaced by indexes which identify the inclusion of the remaining Information Component within files at a number of different logical positions in the directory structure. This can be extended to any set of Information Components which have common sub-components, although minimum size limits for divisible sub-components can be desirable, for example to avoid overly complex indexes or to ensure that each Component contains sufficient information to be a useful result of a search operation.

Figure 3:
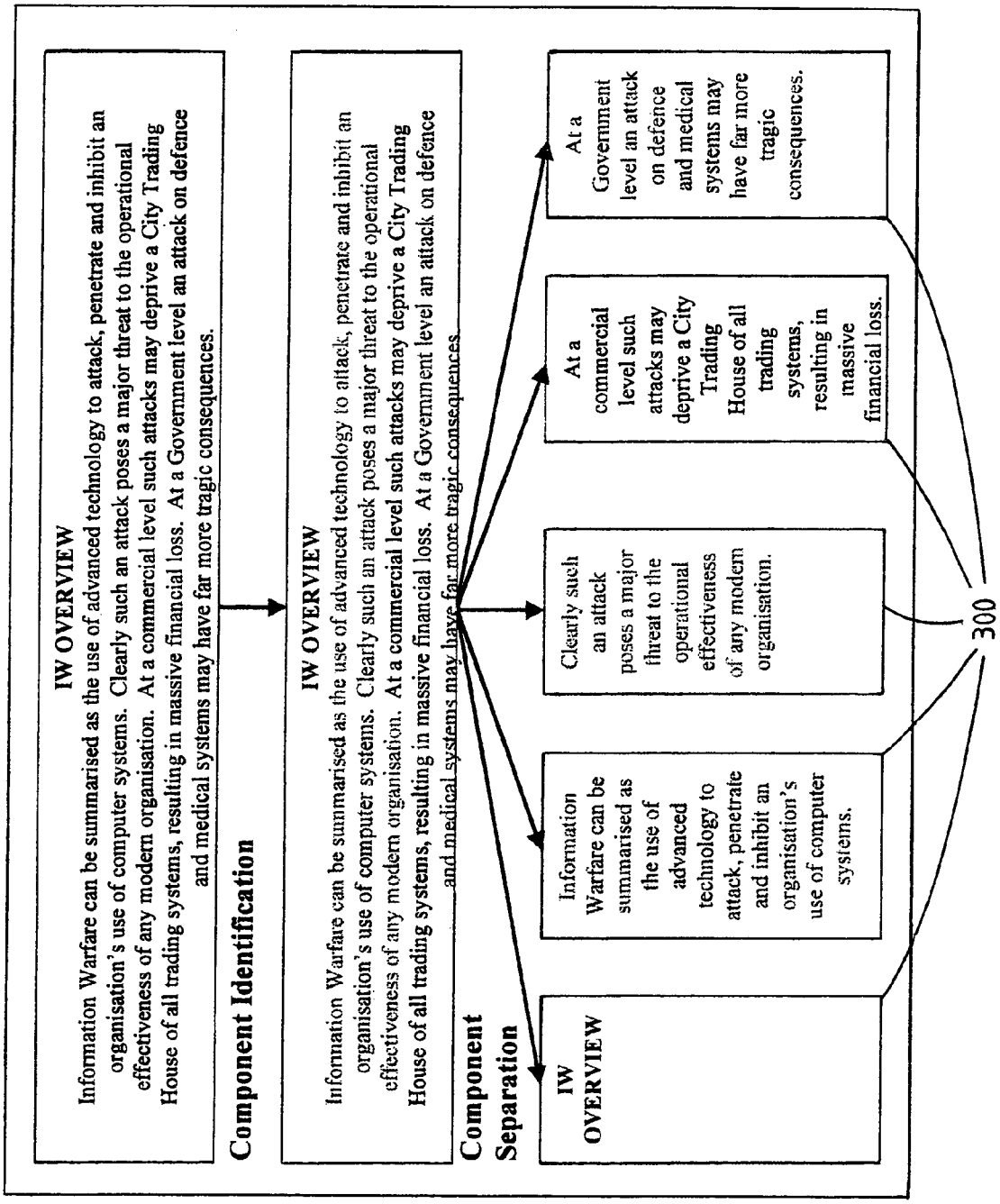
FIG. 3 is a schematic representation of the separation of a text document into Information Components.

FIG. 3 shows an example of the logical separation of data into Information Components 300, using a paragraph of text taken from an actual text file. In this example, Information Component separation rules are based on paragraph separators (new line) and punctuation marks, so the title and each sentence are identified as separate Information Components, subject to a minimum Component size.

Each Information Component is given a unique identifier and an indexing system is constructed to associate the original filename with a sequence of Information Components. In this description, the concept of a directory structure and individual files is maintained for presentation purposes. This is achieved by storing a set of file identifiers comprising the full file name (including the path to it within the user's view of the directory structure) and a description (a set of indexes) of the Information Components making up the file. The indexes of individual components which form part of a file identifier are also stored in association with the Information Components themselves such that the indexes within a file description provide references to a specific set of Information Components. This initial Information Component separation process is applied to every file such that the original file system is replaced by sets of components mapped to files as shown in FIG. 3.

Figure 4:
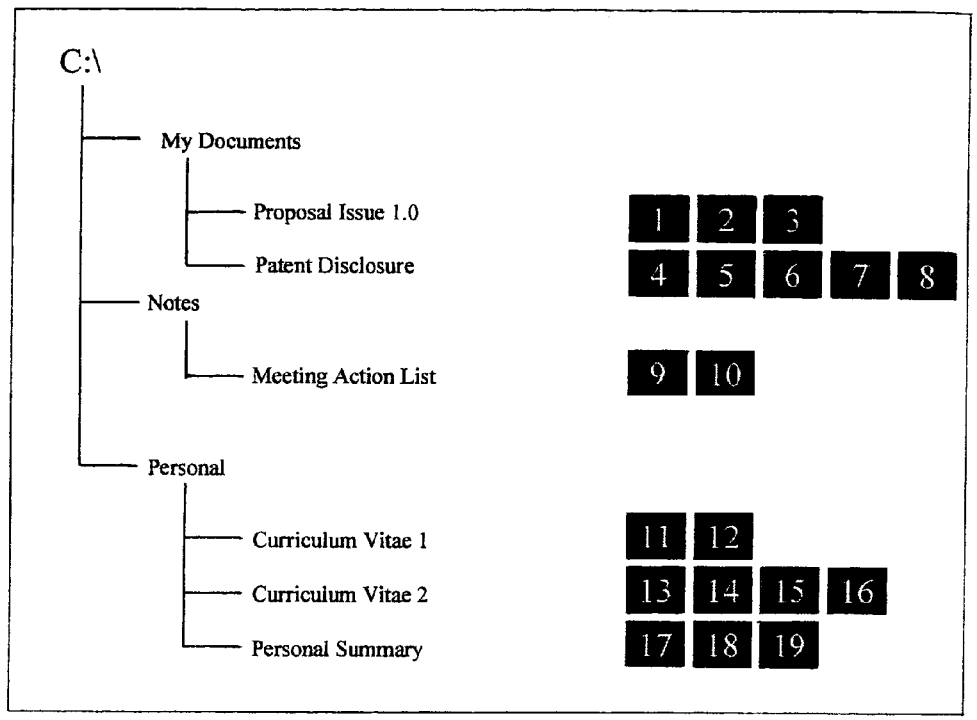
FIG. 4 shows the logical association between files and Information Components.
Figure 5:
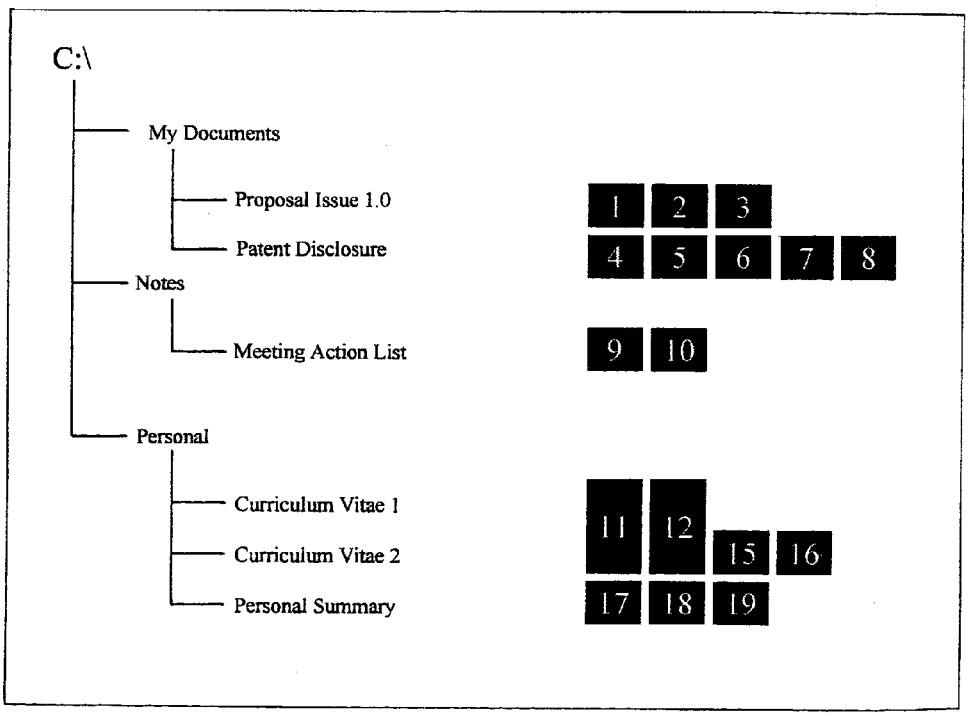
FIG. 5 is a schematic representation of the association between files and Information Components after deletion of duplicate Information Components and updating of index information.

Having separated the content of individual files into a series of Information Components, it is possible to rationalise the Information Components to reduce unnecessary redundancy. Three basic types of rationalisation may be conducted:

Discovery of identical Information Components. For example, referring to FIG. 4, it is possible that Information Components 11 and 12 are identical to Information Components 13 and 14 respectively. Such a match is identified by employing a string matching algorithm, with each Component comprising a separate search string. Identification of these identical components would enable a further revision of the File System as shown in FIG. 5—the duplicate components 13 and 14 are deleted from physical storage and the indexing of the Information Components is updated so that files CV1 and CV2 each include Information Components 11 and 12. This updating of indexes involves changing the index information stored in association with the Information Components themselves and changing the component description of CV1 and CV2.

Figure 6:
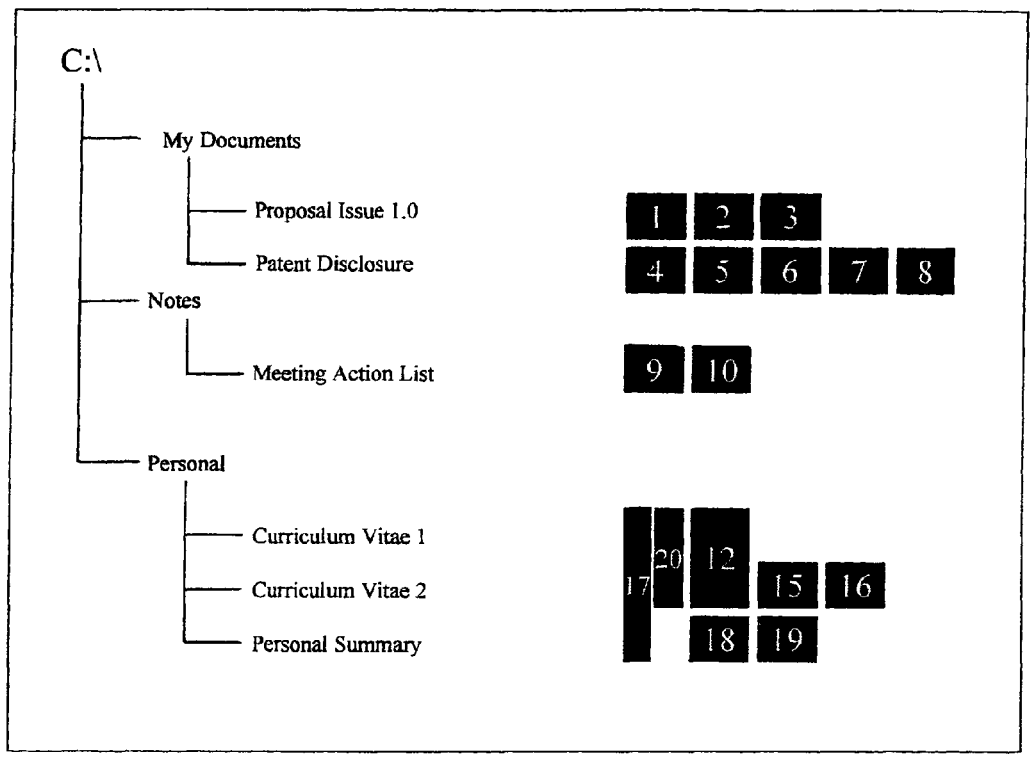
FIG. 6 represents the result of identifying duplicate subcomponents of Information Components and consequent rationalisation of the storage of Information Components.

Discovery of Information Components which constitute part of a larger Information Component. For example, referring to FIG. 5, Information Component 11 may include the entire contents of Information Component 17, as well as additional data such as additional text paragraphs which can be separated out as a new Information Component 20. This would enable a further revision of the File System to remove duplication of the contents of Information Component 17, as shown in FIG. 6.

Figure 7:
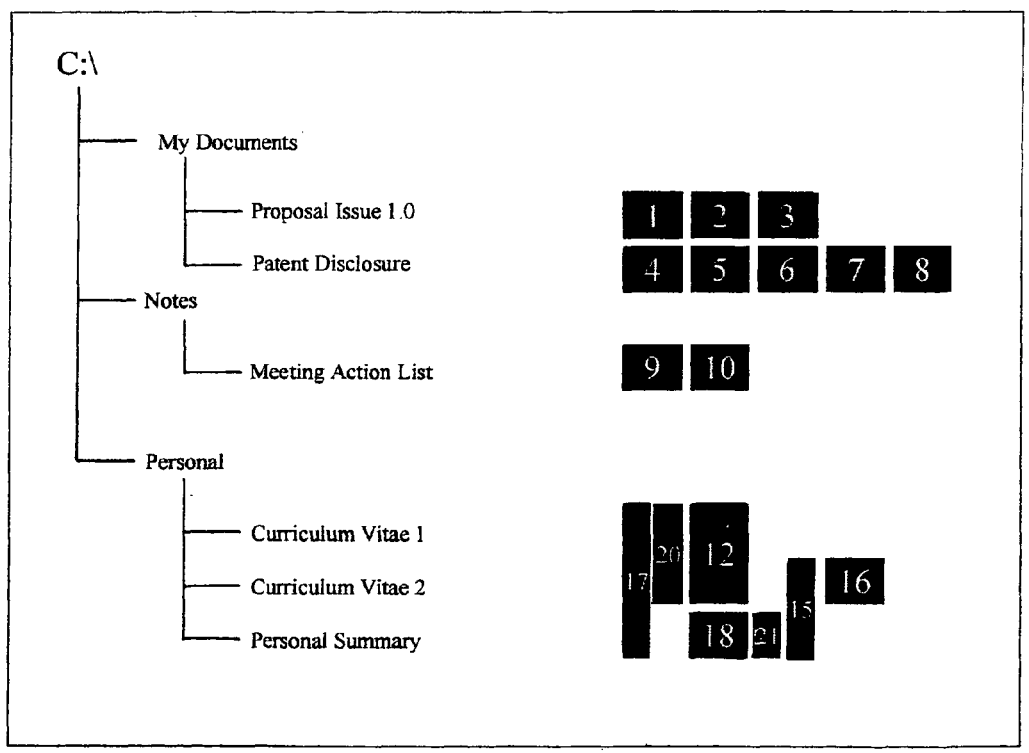
FIG. 7 represents an example in which there is a partial match between two of the Information Components of FIG. 6, such that the text, which is common to both Components, is abstracted into a new Information Component referenced by two documents and a new Information Component is created for the text that is unique to one of the documents.

Identification of sub components which include matching components but are not identical. For example, referring to FIG. 6, Information Components 15 and 19 may be almost identical. Perhaps Information Component's 15 and 19 each comprise a significant sized text string with just one phrase in Component 19 which is not in Component 15. This would enable a further revision of the File System as shown in FIG. 7—which could mean identifying the single phrase as a Component 21 so that duplication of Component 15 can be avoided.

The algorithm used to separate the file content into Information Components proceeds as follows:

Paragraph separators (start of a new line) are identified for first level component separation. A title is identified as a separate paragraph.

The components identified by paragraph separators are then further abstracted into sub components by identifying full stops. A minimum size for a sub component is set, in this case equal to 100 characters, such that if a sub component is less than the minimum size it is merged with the smallest of its adjacent components.

Using this approach, the contents 800 of an original file such as shown in FIG. 8 can be marked up for representation as a set of components of the information store, by automated application of a set of rules. The file system is also amended such that any reference to the original file is replaced by a reference to component <1>. This markup of the file system is shown in FIG. 9. The index information 900 stored for document "IW Summary.doc" includes a document descriptor, which associates the document file name with Information Component <1>, plus a plurality of XML tag pairs (such as <1.1></1.1>) stored within the array of Information Components and serving to delimit the individual Components. A tagging scheme which is well suited to the file system (205) uses a numerically ordered and hierarchical sequence of XML tag pairs within the body of a text document, with a first tag pair <1></1> identifying and delimiting the Information Component corresponding to the full contents of the original file, and tag pairs <1.1></1.1>, <1.2></1.2> to <1.n></1.n> identifying the next level down in the hierarchy. The latter tag pairs may identify the set of text paragraphs within a text document if that is the Component-separation rule. Within each of the initially identified Information Components, for example within the component identified and delimited by tag pair <1.2></1.2>, any sub-components such as text sentences can be identified using tag pairs of the format <1.2.1></1.2.1>, <1.2.2></1.2.2>, etc. This can be extended to any desirable depth of hierarchy. Note that the sequential and hierarchical tag index scheme ensures that each Information Component's storage location relative to other Information Components within the file system can be determined from these unique tag pairs. FIG. 9 shows such an initial separation of a text file into Information Components based on a set of separation rules.

For a fully scalable solution, additional index information can be used. This has been implemented as a table indicating which character within the file system is the first character of an Information Component having a reference tag pair within a given range. For example, it becomes faster to find component <2.1.2> given the knowledge that the first character of Information Component <2> is the 4,321st character of the file system and the first character of Information Component <3> is the 6,442nd character of the file system, since it is evident which portion of the file system to scan through. This is particularly useful when the file system is too large to all be held in memory at one time, such that different segments must be alternately loaded into memory. Furthermore, the index scheme comprising sequentially ordered, hierarchical tags and file descriptors which reference these tags facilitate addition of further index information or meta data as required.

In the following sections of this document, the present invention will be described using a text file as an example. However the present invention is applicable to other file formats and executables. It should also be noted that the examples included in this disclosure are scalable and, in an actual implementation, it is envisaged that the number of files and the size of the extracted components would be larger than those described herein. Hereafter, the term "file" will be used to refer to any storable entity, whether data or an executable item, such as would correspond to a logical unit of storage in a conventional file-based storage system. "Files" are logical entities, which are generally created, downloaded or uploaded under user control, and examples include word-processed documents, executable programs, presentations and spreadsheet data.

Referring back to FIG. 2, the client computer system (125) includes a plurality of user-created text documents within its operating system's file system, and each of these is perceived to be independent files by the system user. Program code implementing a component-based file system (205) is also installed on the computer system (125). All of the text documents, perceived as a set of separate files by the user, are stored in a single text file within the system's non-volatile storage. This single text file contains index information, describing which Information Components are included in which documents, and a collection of tagged Information Components. The client computer system (125) also executes a standard application (215), in this example, a word processing application.

The information augmentation means (210) of the present invention is also executed by the computer system (125) and is responsible for various functions e.g. searching for Information Components and supplementing existing information in an application with the Information Components. In this description, the information augmentation means (210) is executed as an application program, but in alternative embodiments, the information augmentation means (210) could be implemented as an integral component of the operating system.

Also shown in FIG. 2 is a standard clipboard (230) function. The possibility of "copy and paste" was a revolutionary step in improving efficiency for all computer users. Using a mouse to point to and select information on a screen, one can easily mark objects to be copied to a clipboard in the computer's storage and subsequently pasted into a different session running on the same computer. In a copy and paste function, the material to be copied is passed from the user's application session to a system-owned clipboard storage area within the computer's storage. Upon pasting, the material is passed from the clipboard storage area to a current application. In this embodiment, the clipboard (230) communicates with the standard application (215) and also the information augmentation means (210). It should be understood that although a clipboard has been described herein, the present invention can be utilised with any temporary data storage area.

In a preferred embodiment, a user inputs document specifications (e.g. key words or phrases that represent search terms) into the standard application (215), and uses clipboard functionality to copy these terms into the clipboard (230). The information augmentation means (210) polls the clipboard and upon detecting a change (e.g. addition of search terms), initiates a search. The results of the search are fed back to the user.

The information augmentation means (210) will now be described in more detail with reference to FIGS. 10-19.

Figure 10:
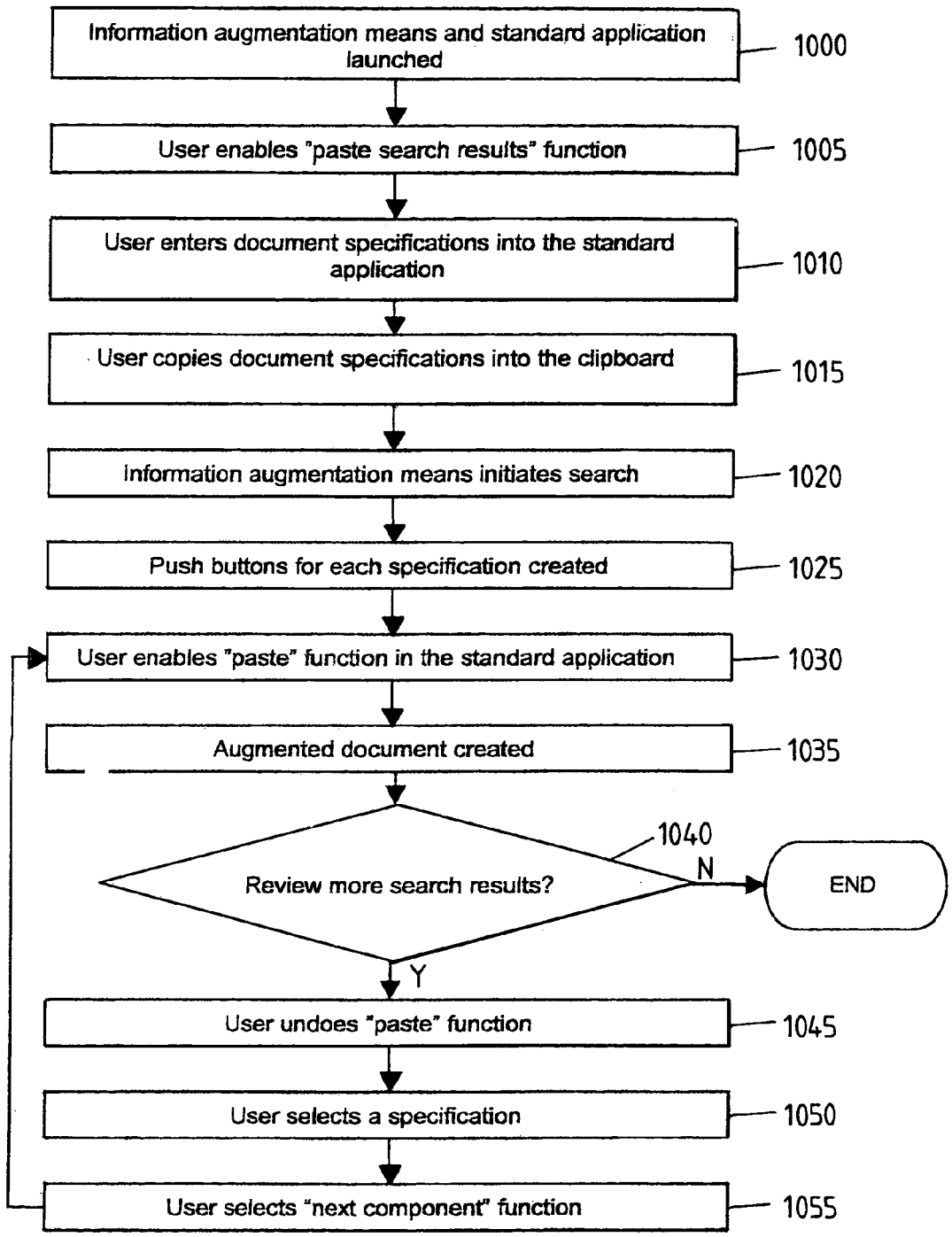
FIG. 10 is a flow chart showing the operational steps involved in the information augmentation process, according to one embodiment.
Figure 11:
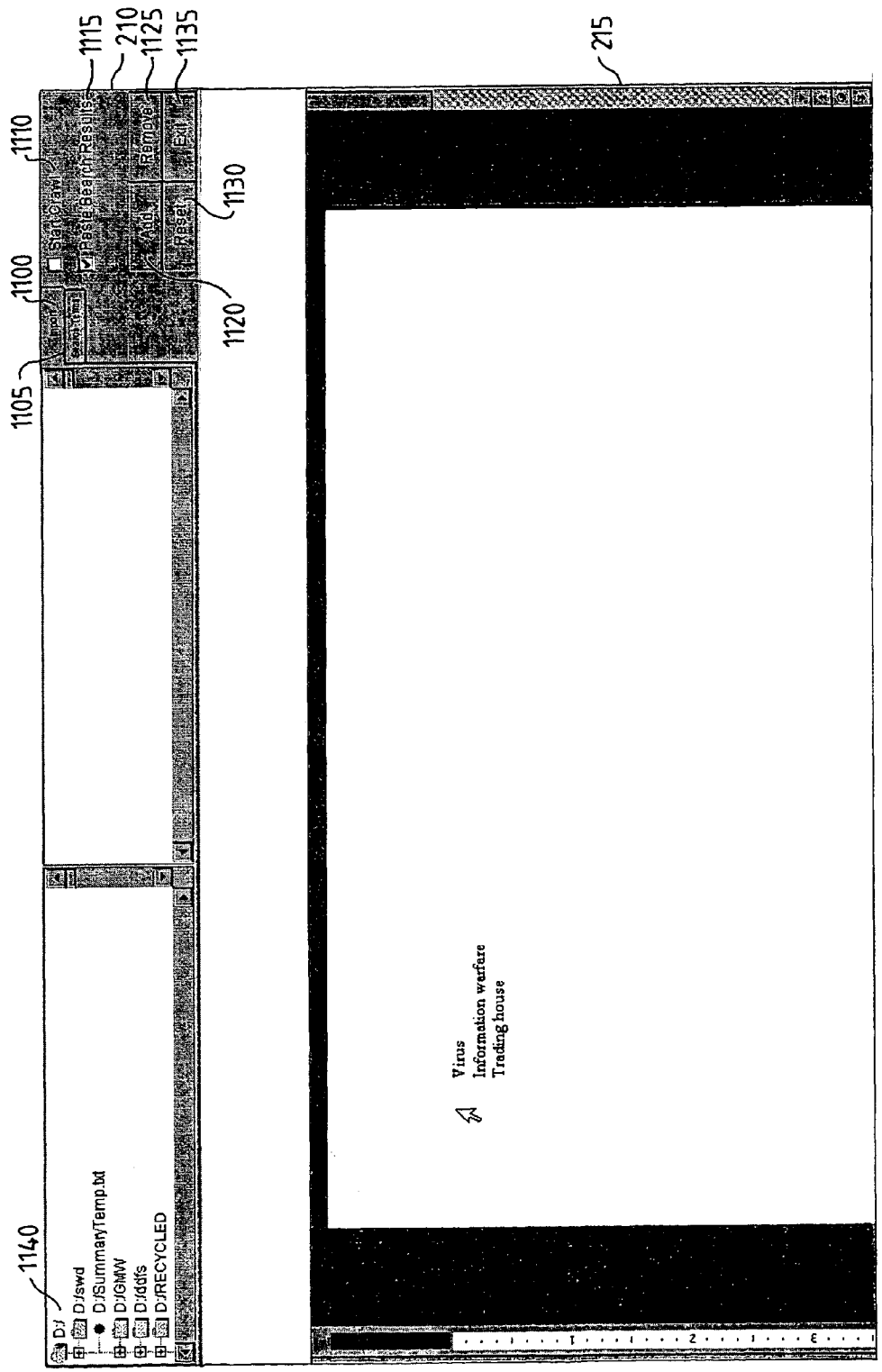
FIG. 11 is a screen image after step 1010 of FIG. 10.

In FIG. 10, a user launches (step 1000) the standard word processing application (215) and the information augmentation means (210), with a view to creating a document. Next, the user enables (step 1005) the "paste search results" check box (1115). The function of the "paste search results" check box (1115) is to paste the results from the search directly to the clipboard. If the check box (1115) is unchecked, the search results are not passed to the clipboard. The "paste search results" function is preferably explicitly enabled by the user but may be enabled by default. Next, the user enters (step 1010) document specifications into the word-processing application (215) as shown in FIG. 11. These specifications represent a user request for 3 sections relating to the key words/phrases:

"Virus".

"Information Warfare."

"Trading house."

Preferably, a more advanced specification is also supported where the user is able to state features such as: the length of the section, the style of the section, the source of the information used to create the section and the date of the source information used to create the section.

Figure 12:
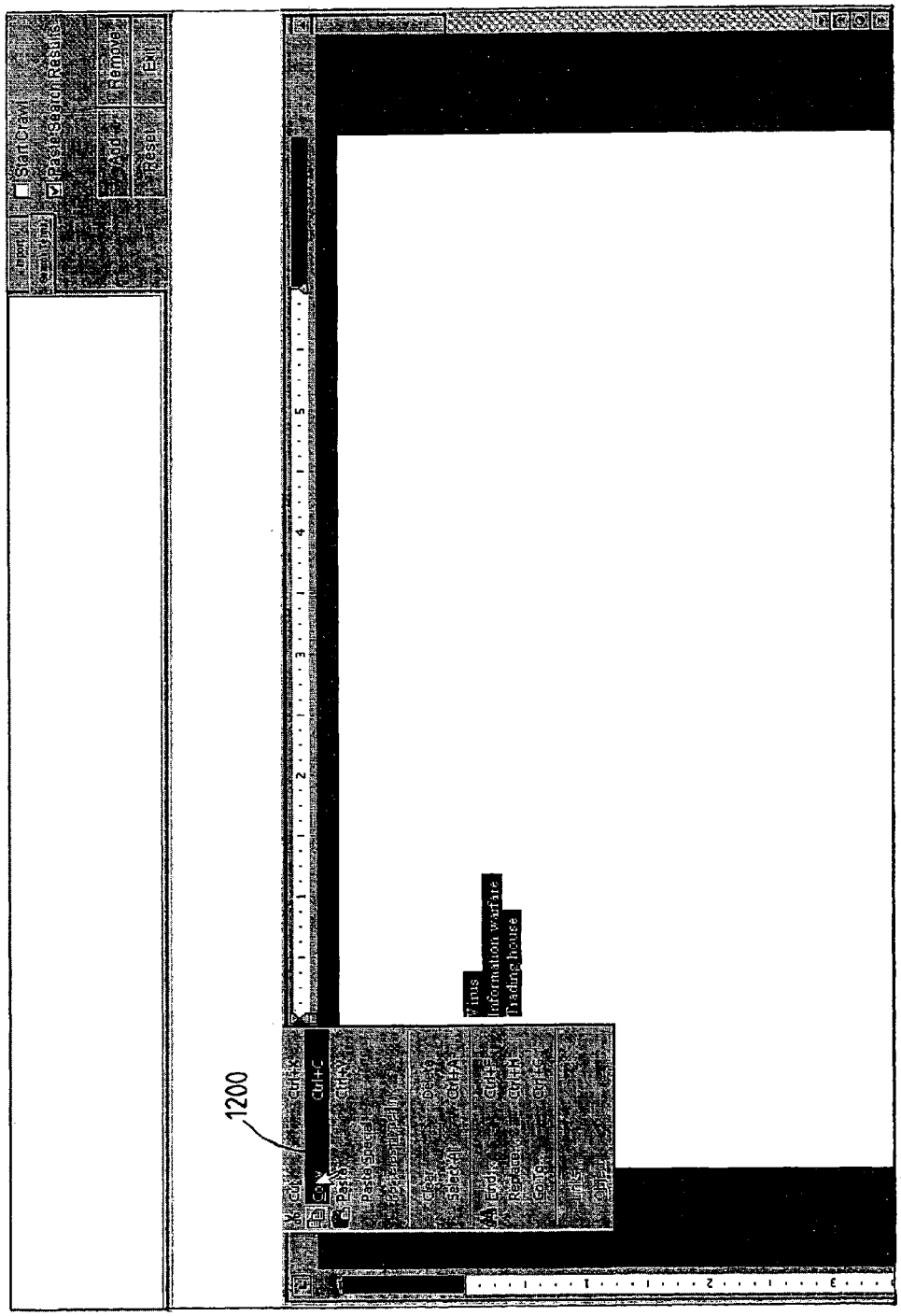
FIG. 12 is a screen image after step 1015 of FIG. 10.

Next, as shown in FIG. 12, the user copies (step 1015) the specifications into the clipboard (230) by using a copy function (1200) (Function A) provided by the standard word processing application (215). The information augmentation means (210) (which has been polling the clipboard (230)) detects the specifications in the clipboard (230) and automatically initiates a search, based on the specifications (step 1020). It should be understood that in an alternative embodiment, the search is not automatic and is initiated manually by the user. In this embodiment, the information augmentation means (210) passes the search items (i.e. the document specifications) (via publish/subscribe technology for example) to at least one agent. The agent uses the search terms to search the information Component Based File System (205). In one preferred implementation, the identification and extraction of Information Components is achieved using simple Java String methods:

indexOf( )—performs a quick search and returns the first character index of a specified string (or character) after a specified starting point; and Substring( )—returns a substring between two points.

The search results (i.e. Information Components relating to the document specifications) are passed back to the information augmentation means (210) (via publish/subscribe technology for example). In this embodiment, since the "paste search results" check box (1115) has been enabled, the search results are pasted directly to the clipboard. When pressed, the "Clipboard" push button (1315) shown in FIG. 13, displays the current state of the clipboard. In this example, the user views the search results for the document specifications.

Figure 13:
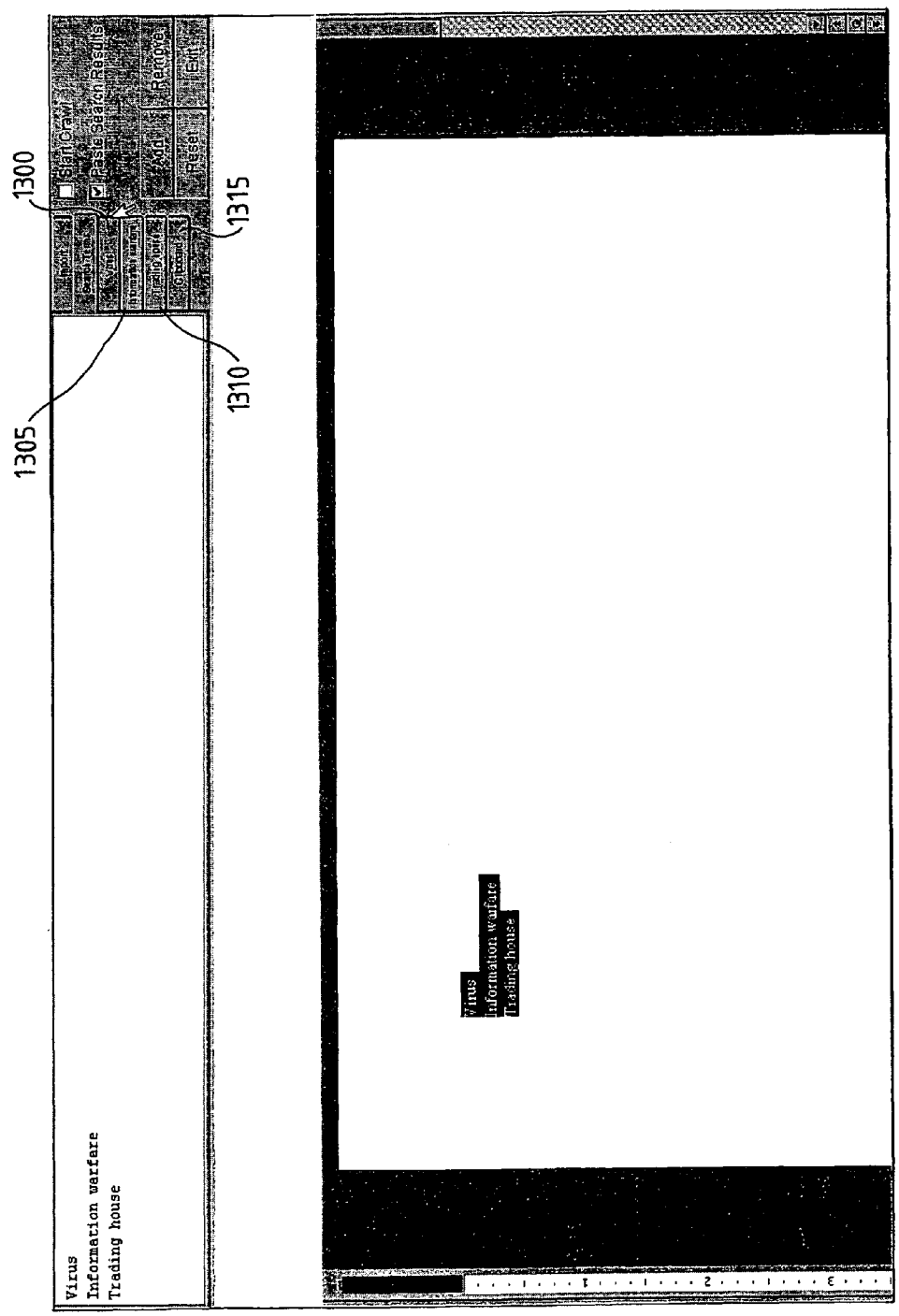
FIG. 13 is a screen image after step 1025 of FIG. 10.
Figure 14:
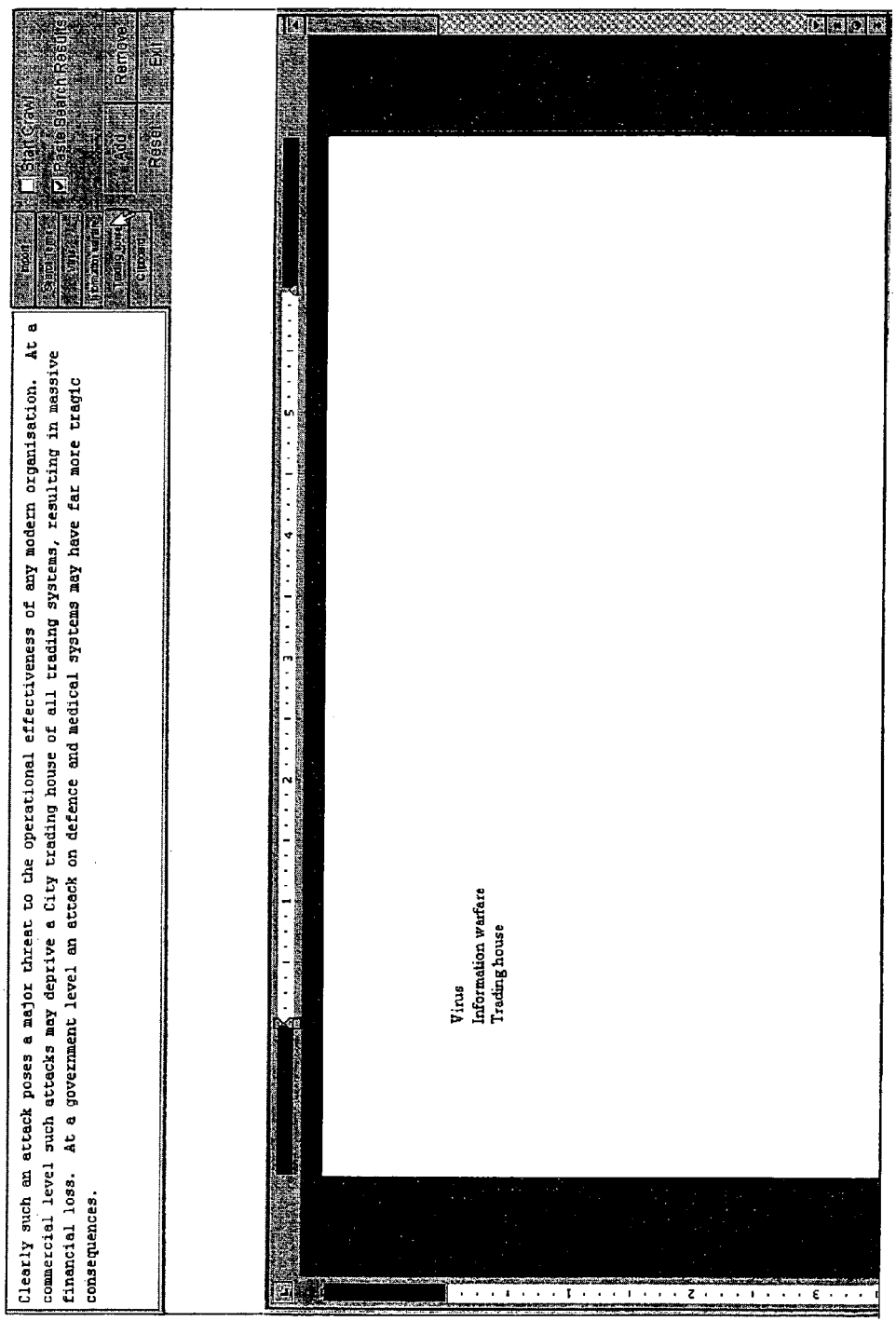
FIG. 14 is a screen image of the reviewing search results function.

Also shown in FIG. 13, are push buttons (1300, 1305, 1310), which are created (step 1025) for each key word/phrase. As shown in FIG. 14, by clicking on the "Trading house" push button (1310) for example, the user can review the first hit of the set of search results for the phrase "Trading house".

Figure 15:
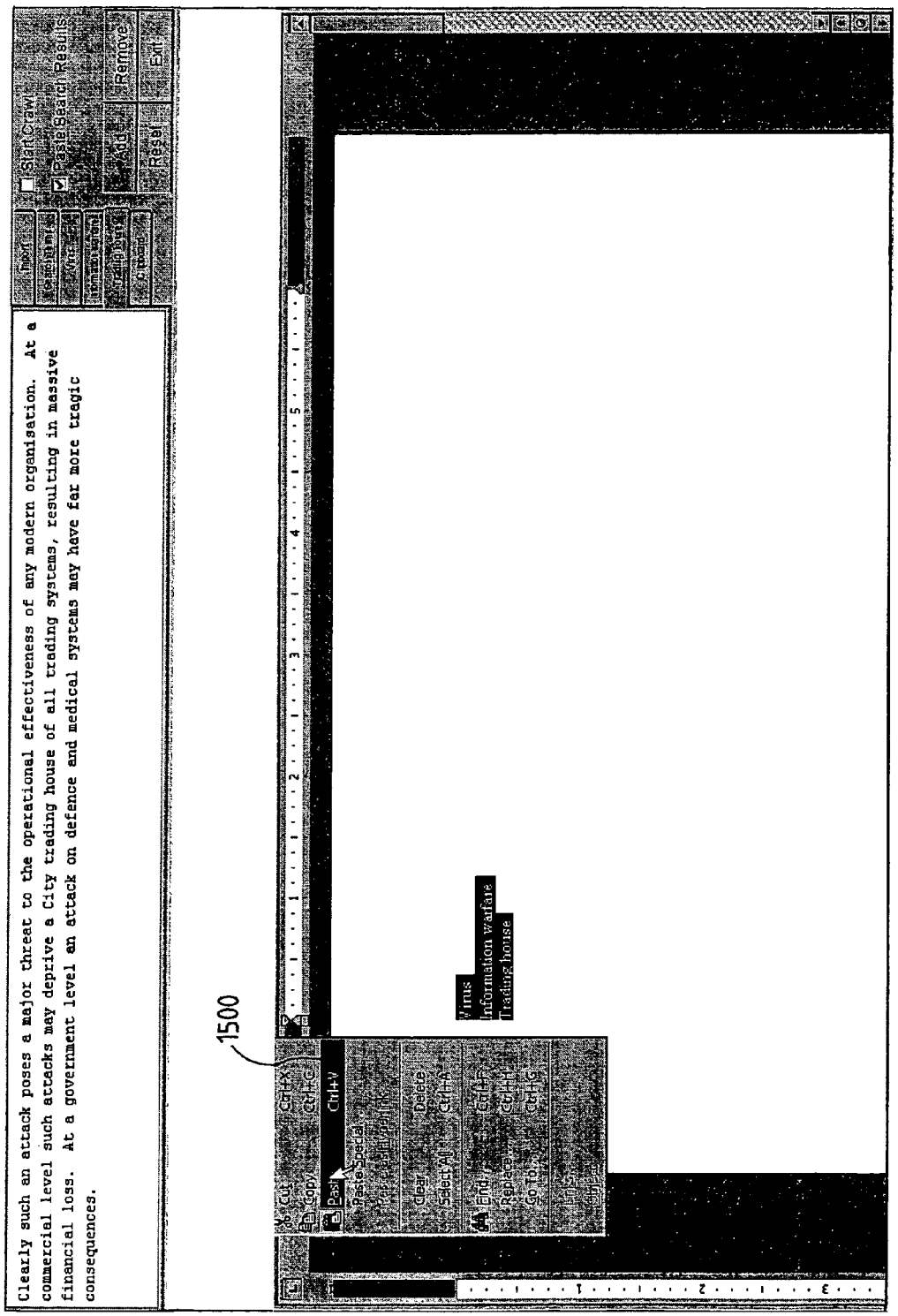
FIG. 15 is a screen image at step 1030 of FIG. 10.

As shown in FIG. 15, the user pastes (step 1030) the search results from the clipboard (230) into the word-processing application (215) by using the paste function (1500) (Function A') as provided by the standard word-processing application (215). It should be understood that the search results are pasted on top of the document specification entered at step 1010 (and shown in FIG. 11).

Figure 16:
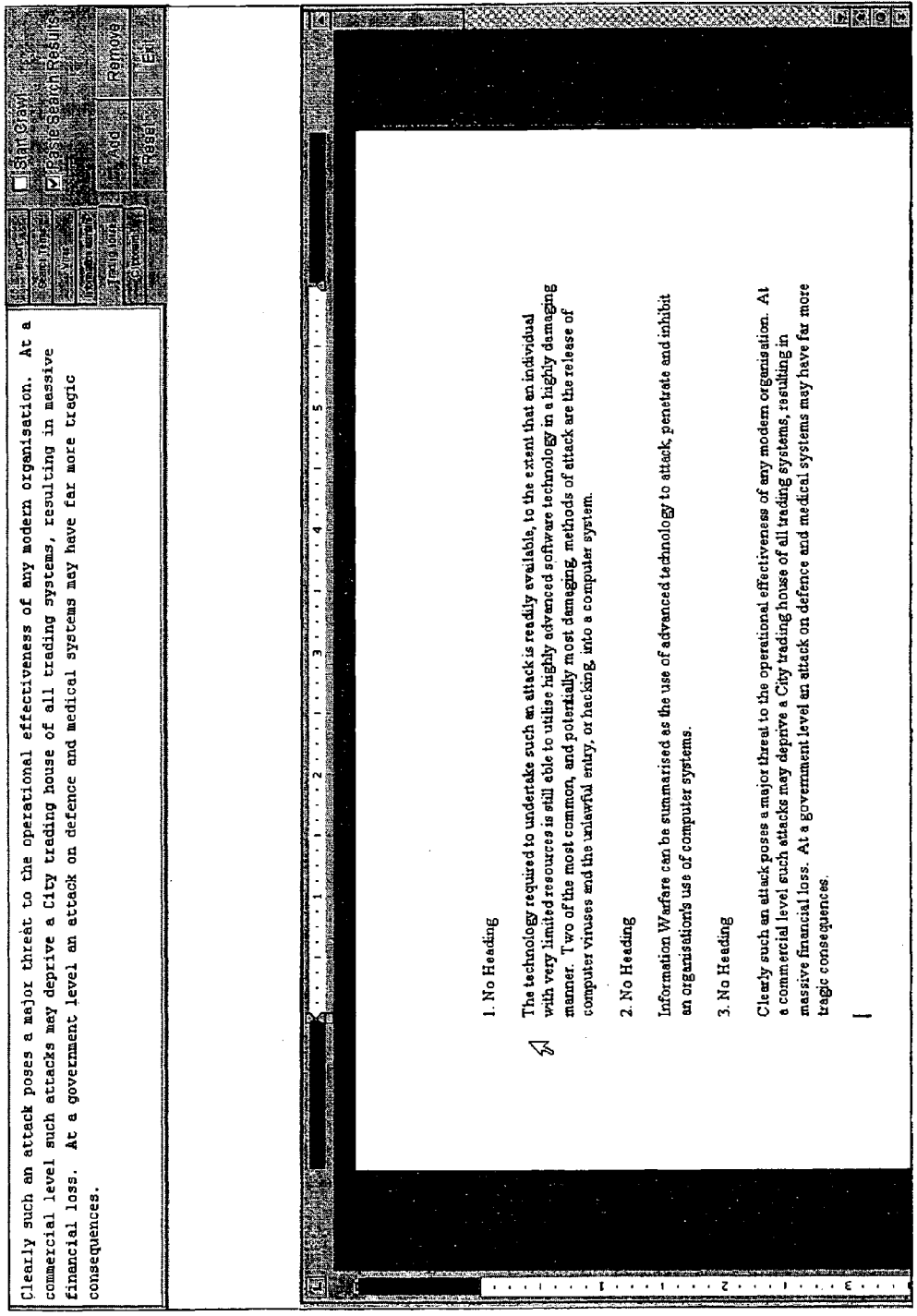
FIG. 16 is a screen image after step 1035 of FIG. 10.

The resulting augmented document is created (step 1035) and is shown in FIG. 16. It can be seen that the first hit of each of the sets of search results for the key words/phrases "Virus", "Information Warfare" and "Trading house" have been "fused" into the document by the information augmentation means (210). The user can now review the document.

Figure 17:
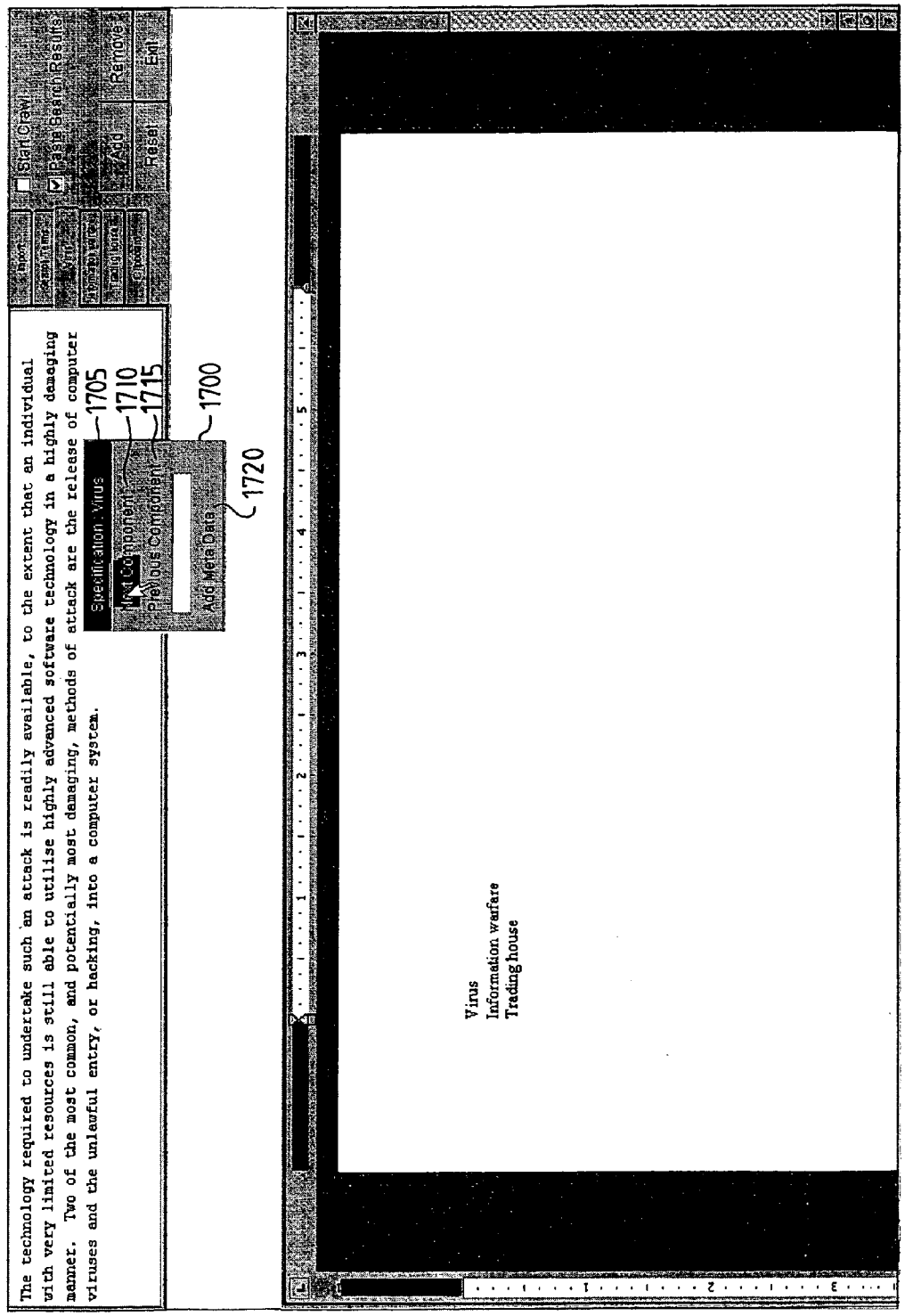
FIG. 17 is a screen image of the reviewing more search results function.

If the user wishes to review more of the search results found for a particular key word/phrase (positive result to step 1040), the user undoes (step 1045) the paste function (Function A') of step 1030. The results are shown in FIG. 17, whereby the original document specifications entered at step 1010 are displayed once more. Next, the user clicks (step 1050) the right mouse button over the specification that the user wants to revisit. In this embodiment, the user selects the virus push button (1300). As shown in FIG. 17. a menu (1700) is displayed with a title bar (1705) of "Specification: Virus". The menu (1700) also comprises various options. The "Next Component" option (1710) allows a user to proceed to the next hit of the search results for the "Virus" specification. The "Previous Component" option (1715) allows a. user to return to the previous hit of the search results for the "Virus" specification. The "Add Meta Data" option (1720) allows a user to associate meta data with a returned search result. For example, if the user finds a particularly useful technical description he can select "add meta data" and then enter "technical". Therefore, the next time the user searches, he can use this meta data as part of the document specification.

Figure 18:
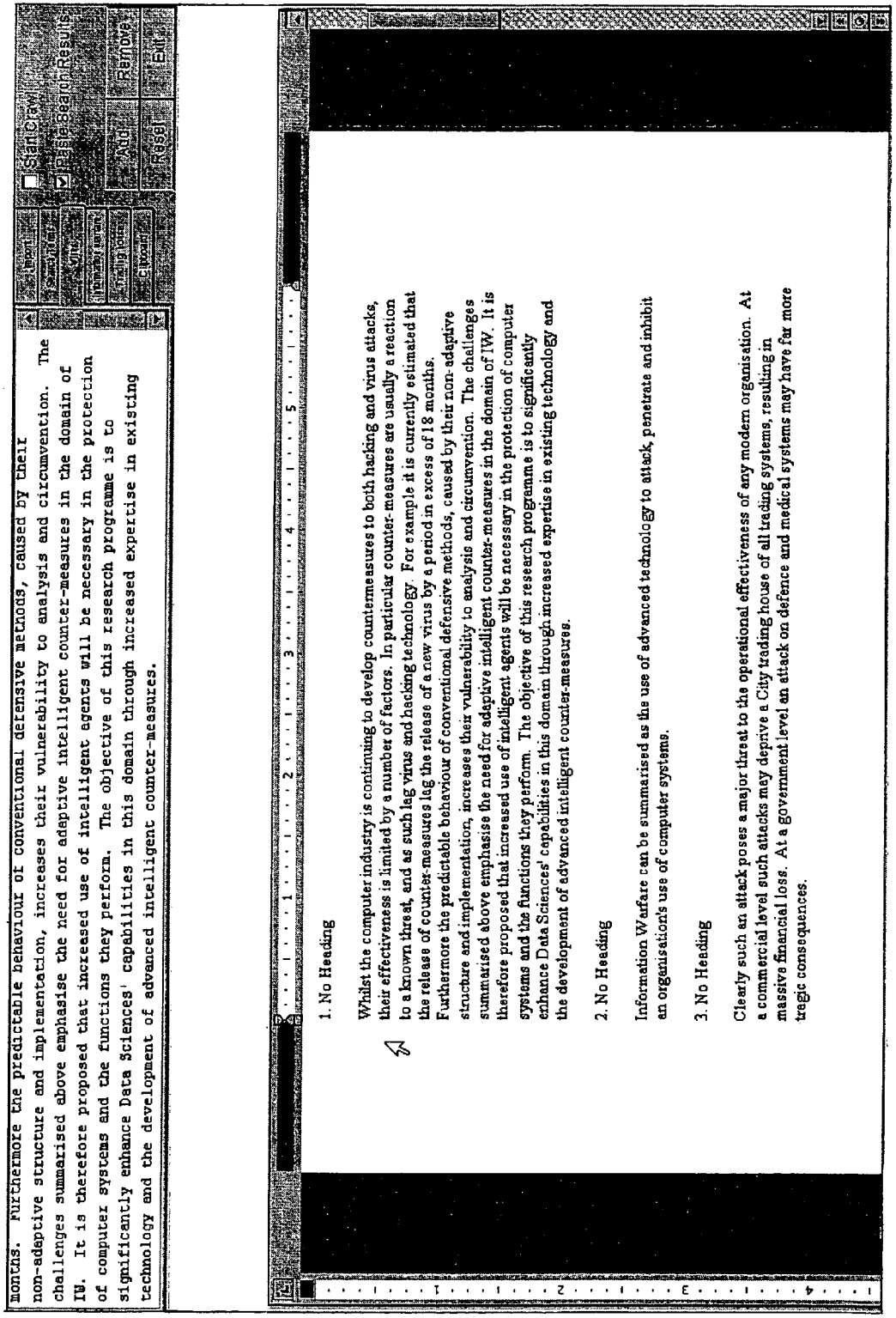
FIG. 18 is a screen image after step 1035 of FIG. 10, whereby the more search results function has been used.

In this embodiment, a user selects (step 1055) the "Next Component" option (1710). The next hit of the search results for the "Virus" specification is displayed in the information augmentation means (210). In this embodiment, the user pastes (step 1030) the search results from the clipboard (230) into the word processing application (215) by using the paste function (1500) (Function A') as provided by the standard word processing application (215). The results are shown in FIG. 18, whereby a new document has been created (step 1035) and a different Information Component for the "Virus" key word has been fused into the document. If the user does not need to review any more of the search results (positive result to step 1040), the process now ends and the user can carry out further operations on the document (e.g. exiting, saving, printing, exporting etc).

Referring back to FIG. 11, the information augmentation means (210) comprises numerous push buttons and check boxes. In this description, a directory structure (1140) and individual files representing the Information Component based file system (205) is shown for presentation purposes. An "import" button (1100) is provided, to allow the user to import documents (e.g. from the standard word processing application (215)) into the directory structure (1140). Preferably, the user can also import URLs, files from other applications etc. The "start crawl" (1110) button recurses through the Information Component Based File System (205) in order to build a repository of documents. The function of the "search terms" button (1105) is to display the key words/phrases (described as document specifications herein and described in more detail later) that are the subject of the current search. The function of the "add" button (1120) is to add files to the Information Component file system. The function of the "remove" button (1125) is to remove files from the Information Component file system. The function of the "reset" button (1130) is to cancel the search. The function of the "exit" button (1135) is to exit out of the information augmentation means (210).

Figure 19:
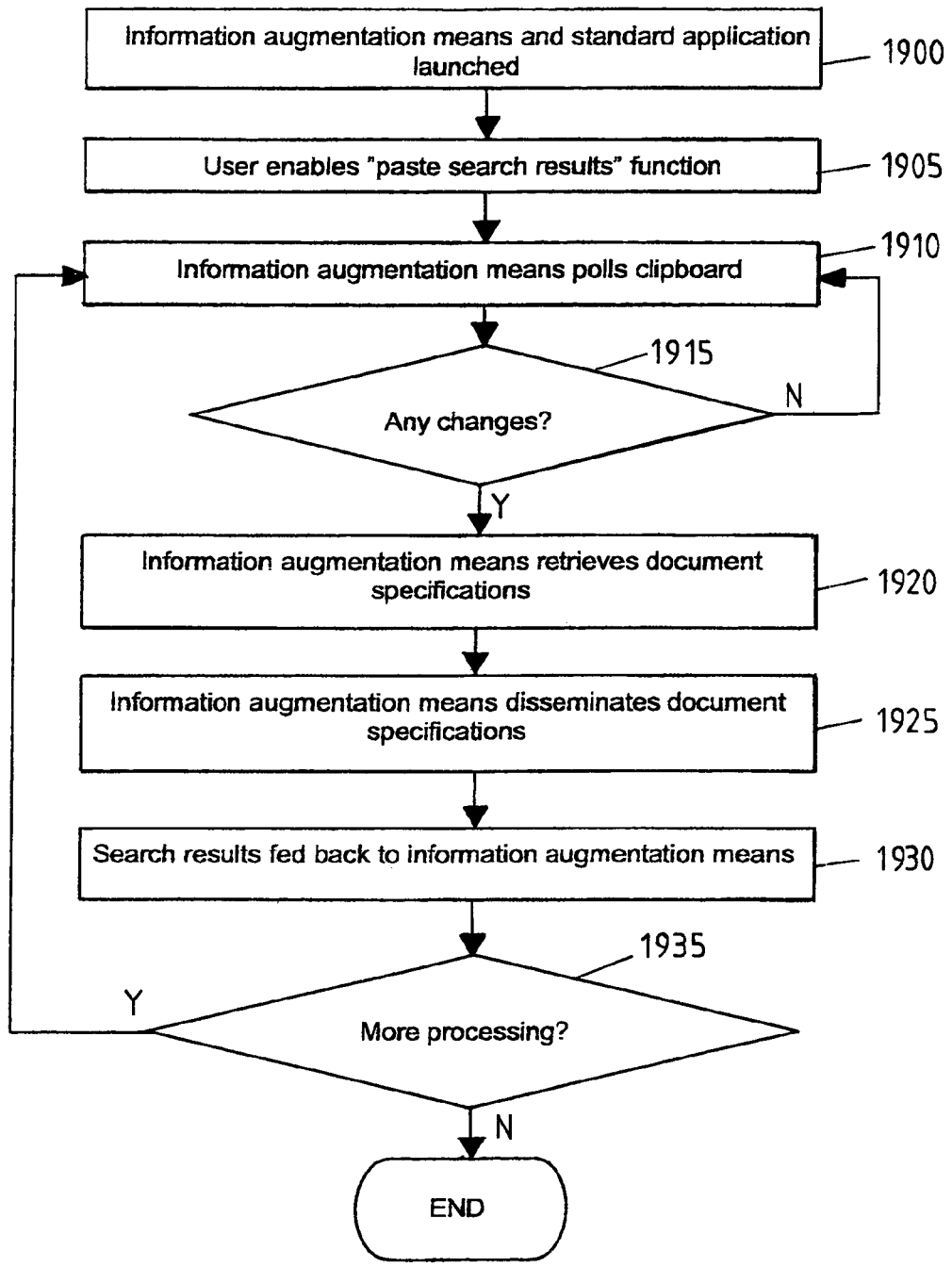
FIG. 19 is a flow chart showing the operational steps involved in the information augmentation process, according to another embodiment.

Referring back to FIG. 2 and with reference to FIG. 19, in an alternative embodiment, a user launches (step 1900) the standard word processing application (215) and the information augmentation means (210) with a view to creating a document. The user enables (step 1905) the "paste search results" check box (1115).

Next, the information augmentation means (210) polls (step 1910) the clipboard (230) for any changes. The polling frequency is preferably set by the user. If a user does not copy specifications from the document to the clipboard (230), (negative result to step 1915) preferably, the information augmentation means (210) continues to poll. It should be understood that in alternative embodiments the user could exit from the applications.

If a user enters a specification and copies it to the clipboard (230), (positive result to step 1915) preferably, the information augmentation means (210) retrieves (step 1920) the specification. In this embodiment, the information augmentation means (210) preferably disseminates (step 1925) the specification. In one embodiment, the information augmentation means (210) uses a publish/subscribe engine (225). Advantageously, the publish/subscribe engine (225) publishes the specification to its subscribers and any search results are fed back to the publish/subscribe engine (225). Publish/subscribe engines are well known in the art and will not be discussed in more detail herein. In another embodiment, the information augmentation means (210) sends the specification to a computer software agent (220), which in turn sends the results to a web server (110) having a store of web sites (115). Any search results are fed back to the agent (220). Agents and web servers are well known in the art and will not be discussed in more detail herein. Although a publish/subscribe engine and agent technology have been discussed herein, it should be understood that other techniques of information retrieval can be utilized with the present invention e.g. search engines.

At step 1930, the search results (from the publish/subscribe engine or agent) are fed to the information augmentation means (210) via the network (105). Since the "paste search results" (1115) check box is enabled, the results are pasted directly into the clipboard (230). The user then issues a paste function (Function B') to paste the results from the clipboard (230) to the document. As described with reference to FIG. 10, the first hit for the specification is then fused into the document by the information augmentation means (210). The user can now review the document and if need be, can review more of the search results found. At step 1935, if more processing is to occur the process returns to step 1910, otherwise, the process ends.

It will be apparent from the above description that, by using the techniques of the preferred embodiment, a technique for allowing searching and document authoring together with existing technology is provided. Advantageously, existing applications and technology do not need to be reconfigured.

Beneficially, document specifications are expanded through an iterative search process. Rather than honing the document specifications, as is the case with current search technology, the document specifications are expanded. Unlike current information retrieval technology, the present invention allows a user to identify and work with the part(s) of the information space of particular interest. In return, he will preferably be offered a range of possible sources from which to choose. Also, the user can benefit from the present invention with relatively few operations (i.e. pairs of copy/paste operations). Yet another advantage is that by preferably using the Information Component Based File System, since duplications of Information Components are removed, the number of "hits" for search results provided to a user decreases and therefore the user does not have to trawl through irrelevant search results.

It should be understood that preferably, the user has the option of disabling the information augmentation means (210) so that the standard application he is working on can be used as is. Furthermore, the automatic pasting of results option is also preferable and the user is provided with the option to approve results before they are pasted into the document he is working on.

It should be understood that although the preferred embodiment has been described within a networked client-server environment, in an alternative embodiment any other environment can be used, for example, in a stand-alone environment. Advantageously, in the latter environment, since the process of searching Information Components is finite as it is based upon a set number files, the search will be relatively quicker than in a distributed environment.

The invention claimed is:

1. A method of augmentation in a data processing apparatus, the data processing apparatus having access to an information repository, means for executing an application, and a temporary data storage area, wherein a specification is entered into the application and copied from the application into the temporary data storage area, the method comprising the steps of:
   polling the temporary data storage area in order to detect the specification;
   retrieving the specification from the temporary data storage area;
   searching the information repository for information relating to the specification, wherein the information comprises a search result derived from the searching;
   passing the information to the temporary data storage area;
   pasting the information from the temporary data storage area to augment application with the information, wherein the search result is pasted into the application from the temporary data storage area;
   associating metadata with the search result;
   adding the metadata to the specification, wherein a second specification is formed by adding;
   performing the second search of the information repository for second information relating to the second specification, wherein the second information comprises a second search result derived from the second search.

2. A method as claimed in claim 1, wherein said information is automatically passed to said area.

3. A method as claimed in claim 1, wherein said searching step is executed by a software agent.

4. A method as claimed in claim 1, wherein said information comprises at least one information component.

5. A method as claimed in claim 4 wherein said at least one information component is displayed.

6. A method as claimed in claim 1, wherein said information repository is stored on a remote data processing apparatus.

7. A data processing apparatus for augmentation, the apparatus having access to an information repository, means for executing an application, and a temporary data storage area, wherein a specification is entered into the application and copied from the application into the temporary data storage area, the apparatus further comprising:
   means for polling the temporary data storage area in order to detect the specification;
   means for retrieving the specification from the temporary data storage area;
   means for searching the information repository for information relating to the specification, wherein the information comprises a search result derived from the searching;
   means for passing the information to the temporary data storage area;
   means for pasting the information from the temporary data storage area to augment the application with the information, wherein the search result is pasted into the application from the temporary data storage area;
   means for associating metadata with the search result;
   means for adding the metadata to the specification, wherein a second specification is formed by adding;
   means for performing the second search of the information repository for second information relating to the second specification, wherein the second information comprises a second search result derived from the second search.

8. An apparatus as claimed in claim 7, wherein said information is automatically passed to said area.

9. An apparatus as claimed in claim 7, wherein said means for searching comprises a software agent.

10. An apparatus as claimed in claim 7, wherein said information comprises at least one information component.

11. An apparatus as claimed in claim 9, further comprising means for displaying at least one information component.

12. An apparatus as claimed in claim 7, wherein said information repository is stored on a remote data processing apparatus.

13. A computer program product stored on a computer readable medium for, when run on a computer, instructing the computer to carry out the method of claim 1.

14. The method of claim 1 further comprising:
   separating repository information in the information repository into information components;
   comparing repository information in the information components to identify a set of duplicate information components; and
   deleting all but one information component in the set of duplicate information components from the information repository.

15. The data processing apparatus of claim 7 further comprising;
   means for separating repository information in the information repository into information components;
   means for comparing repository information in the information components to identify a set of duplicate information components; and
   means for deleting all but one information component in the set of duplicate information components from the information repository.

* * * * *